United States Patent
Geissler et al.

(10) Patent No.: US 10,213,781 B2
(45) Date of Patent: Feb. 26, 2019

(54) METHOD AND DEVICE FOR ORIENTING INDIVIDUAL ELEMENTS, IN PARTICULAR FILTER ELEMENTS, DURING THE TRANSFER THEREOF FURTHER PROCESSING

(71) Applicant: HEKUMA GMBH, Eching (DE)

(72) Inventors: Anton Geissler, Eching (DE); Konrad Hintermaier, Berglern (DE)

(73) Assignee: HEKUMA GMBH, Eching (DE)

( * ) Notice: Subject to any disclaimer, the term of this patent is extended or adjusted under 35 U.S.C. 154(b) by 0 days.

(21) Appl. No.: 15/310,757

(22) PCT Filed: May 13, 2015

(86) PCT No.: PCT/EP2015/060550
§ 371 (c)(1),
(2) Date: Nov. 12, 2016

(87) PCT Pub. No.: WO2015/173282
PCT Pub. Date: Nov. 19, 2015

(65) Prior Publication Data
US 2017/0080414 A1    Mar. 23, 2017

(30) Foreign Application Priority Data

May 13, 2014  (DE) .................. 10 2014 209 001

(51) Int. Cl.
*B65G 47/256*  (2006.01)
*B65G 47/24*   (2006.01)
(Continued)

(52) U.S. Cl.
CPC ........... *B01L 3/0275* (2013.01); *B23P 19/003* (2013.01); *B29C 31/008* (2013.01);
(Continued)

(58) Field of Classification Search
CPC ....... B01L 3/02; B65G 47/256; B65G 47/248; B65G 47/244; B65G 47/252
(Continued)

(56) References Cited

U.S. PATENT DOCUMENTS 4,082,188 A * 4/1978 Grimmell ............... B07C 5/342
                                                      198/403
4,394,933 A * 7/1983 Ackley ............... B65G 47/1471
                                                    198/377.01
(Continued)

FOREIGN PATENT DOCUMENTS

DE    202013103784 U1    9/2013
DE    102013204425       9/2014
(Continued)

*Primary Examiner* — Gregory W Adams
(74) *Attorney, Agent, or Firm* — Horst M. Kasper, Esq

(57) ABSTRACT

Method for aligning single elements (4) arranged in receiving pockets (3) of a transfer means (2), wherein the receiving pockets (3) are arranged in rows and are moved stepwise from one station into a following station, comprising the following steps: determining in which receiving pockets (3) incorrectly aligned single elements (4) are present, ejecting the single elements (4) determined as incorrectly aligned from the associated receiving pockets (3), turning the ejected single elements (4) by 180°, and re-inserting the turned single elements (4) into the associated receiving pockets (3).

11 Claims, 6 Drawing Sheets

Figure 1:
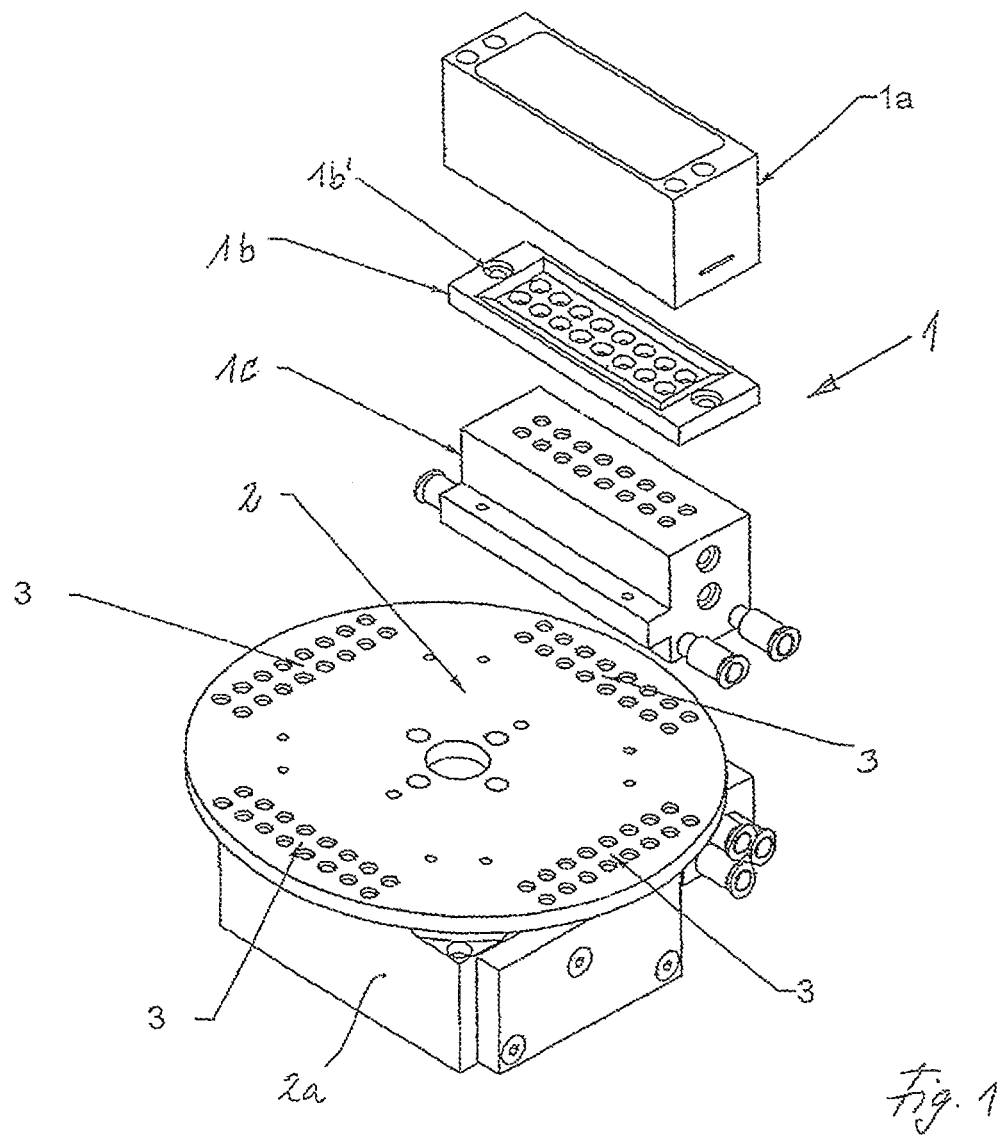

(51) Int. Cl.
*B01L 3/02* (2006.01)
*B23P 19/00* (2006.01)
*B29C 31/00* (2006.01)

(52) U.S. Cl.
CPC ........ *B65G 47/256* (2013.01); *B01L 2200/12* (2013.01); *B01L 2300/0681* (2013.01)

(58) Field of Classification Search
USPC .................................... 198/397.01–397.05
See application file for complete search history.

(56) References Cited

U.S. PATENT DOCUMENTS

| | | | | |
|---|---|---|---|---|
| 5,536,138 | A | * 7/1996 | Garcia | H01R 13/2414 221/267 |
| 5,735,382 | A | 4/1998 | Jung | |
| 6,189,676 | B1 | * 2/2001 | Ansaloni | A61J 3/074 198/399 |
| 6,325,200 | B1 | * 12/2001 | Poppi | B65B 7/2807 198/395 |
| 6,434,911 | B1 | * 8/2002 | Yamamoto | A61J 3/074 53/53 |
| 6,739,455 | B2 | * 5/2004 | Yamamoto | A61J 3/074 209/643 |
| 2004/0011623 | A1 | * 1/2004 | Sala | B65G 47/1471 198/373 |

FOREIGN PATENT DOCUMENTS

EP         1281643 A1    2/2003
WO   WO 2014/207022 A1   12/2014

* cited by examiner

METHOD AND DEVICE FOR ORIENTING INDIVIDUAL ELEMENTS, IN PARTICULAR FILTER ELEMENTS, DURING THE TRANSFER THEREOF FURTHER PROCESSING

The invention relates to a method and a device for aligning single elements, especially filter elements, during transfer for further processing and handling, like, for example, for inserting in injection molded parts, especially pipette tips.

DE 10 2013 204 425 describes a device by means of which the cylindrical filter elements in the form of bulk material are inserted by a separation means into receiving bores of a transfer means, wherein spaced-apart groups of bores are provided in the circumferential area of a rotating table, for receiving the filter elements. The rotating table forms a transfer means between the separation means and a presentation position of the filter elements, from which the filter elements are inserted in pipette tips by a handling means.

Certain filter types must be inserted into the pipette tips in a determined alignment. Multicomponent filters are also used which consist of two or more components wherein such multicomponent filters must be inserted into the pipette tips in a determined alignment. During the separation of the multicomponent filters present as bulk material they are inserted into the receiving bores of the transfer means in different alignments, so that at the presentation position of the transfer means, multicomponent filters are present which are aligned differently within a group. Before the insertion in the pipette tips, all filter elements within a group must be brought into the same alignment.

The invention is based on the object of proposing a method and a device for bringing incorrectly aligned single elements or filter elements respectively into the correct position before they are processed further and inserted into pipette tips.

According to the invention, single elements or filter elements respectively, which are identified as incorrectly aligned, are removed in a station from the receiving pocket of a transfer means moving stepwise, turned, and inserted again, in the correct alignment, preferably in the same station.

In a method for the alignment of single elements, especially of filter elements, arranged in receiving pockets of a transfer means, wherein the receiving pockets are arranged in rows or in groups and are moved stepwise from a station into a following station, the following steps are carried out: determining in which receiving pockets incorrectly aligned single elements are present,
ejecting the single elements determined to be incorrectly aligned from the associated receiving pockets, turning the ejected single elements by 180°, and
re-inserting the turned single elements into the associated receiving pockets.

Here, the determination of the alignment of the single elements is advantageously carried out in one station, whereupon in a following station incorrectly aligned single elements are ejected, turned and inserted again into the associated receiving pockets, whereupon the group of receiving pockets can be moved to the next station.

It is advantageous if, during the turning of the single elements, they are held back for a predetermined time in the turning means, before they are again inserted into the receiving pockets.

The single elements to be turned are transferred from the receiving pockets into at least one turning member provided with recesses or bores, which is rotated by 180°, whereupon the single elements are transferred from the bores or recesses into the receiving pockets again.

A device for the alignment of single elements, especially of filter elements, has a plate-shaped transfer means, in which receiving pockets are arranged in groups or rows, wherein the transfer means is moved stepwise from a station into a following station. A position recognition means, for example an electronic camera, determines the alignment of the single elements in the receiving pockets and outputs a signal to an ejection means if a wrong alignment of a single element is determined, so that the ejection means ejects the single element recognized as incorrect from the associated receiving pocket and transfers it into a turning means, which turns the ejected single element such that it can be inserted again, in a turned state, into the receiving pocket.

As a turning means, for example, a plate which is swivelable by 180°, or a cylinder rotatable by 180°, can be provided as a turning member, wherein the turning member has recesses or bores for receiving a single element to be turned.

The turning means can also have a plurality of turning members.

If the turning member is formed as a turning cylinder, then diametrically extending receiving bores and recesses are provided therein, in which the single elements to be turned are received.

It is advantageous if the turning cylinder is rotatable in a stationary sleeve or in a stationary block, wherein the sleeve or the block has bores or recesses positioned opposite the bores or recesses in the turning cylinder, wherein the bore at a distance from the receiving pockets has a diameter smaller than the diameter of the receiving bores in the turning cylinder, so that the single element in the turning cylinder can be charged with suction pressure or high pressure.

A plurality of turning cylinders positioned adjacent to each other and singly rotatable can be provided as the turning means.

It is advantageous if at least one releasable holding-back means is provided, which holds a single element to be turned ready to be delivered into the turning member, so that the turned single element can also be transferred at a determined time point, or even in another station, into the associated receiving pocket.

The receiving pockets are advantageously provided with a blow bore, so that single elements can be sucked in by means of low pressure and ejected by means of high pressure.

The turning means is preferably arranged stationary above the transfer means which is movable from station to station; however, it can also be movable relative to the transfer means.

For controlling the different processes, an electronic control means is provided, which controls the progression of the different processes, wherein, for example, the control means triggers the ejection means in dependence on the signals output by the position recognition means, triggers the turning cylinder or cylinders, and the like.

Advantageously, the single elements identified as incorrectly aligned are preferably turned by blowing- and/or suction pressure into a recess or bore of a turning member, which is turned by 180°, whereupon the single elements turned in this way are again transferred, preferably by blowing- and/or suction pressure, into the receiving pockets of the transfer means.

Figure 2:
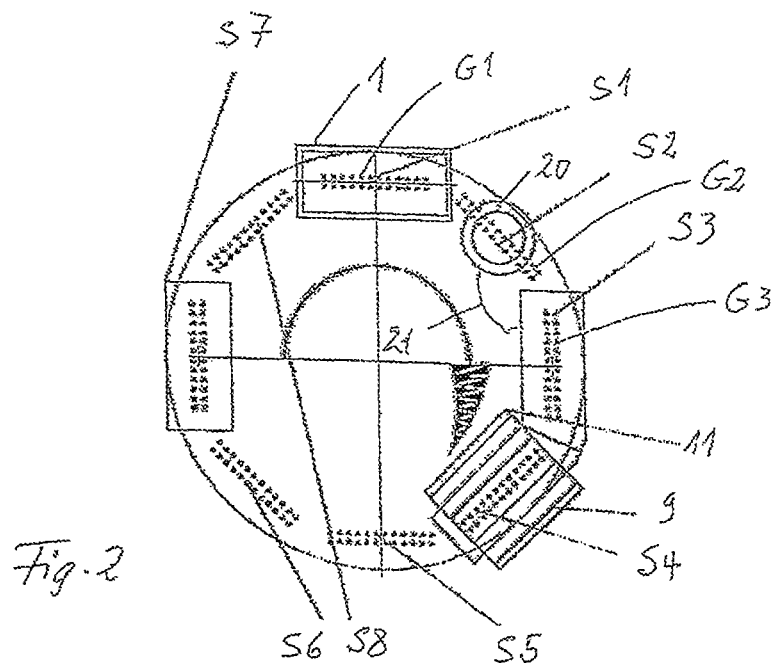
Figure 3:
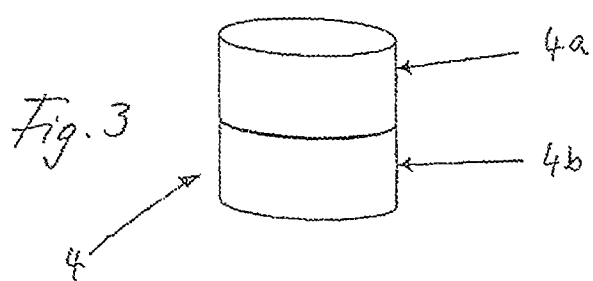
Figure 4:
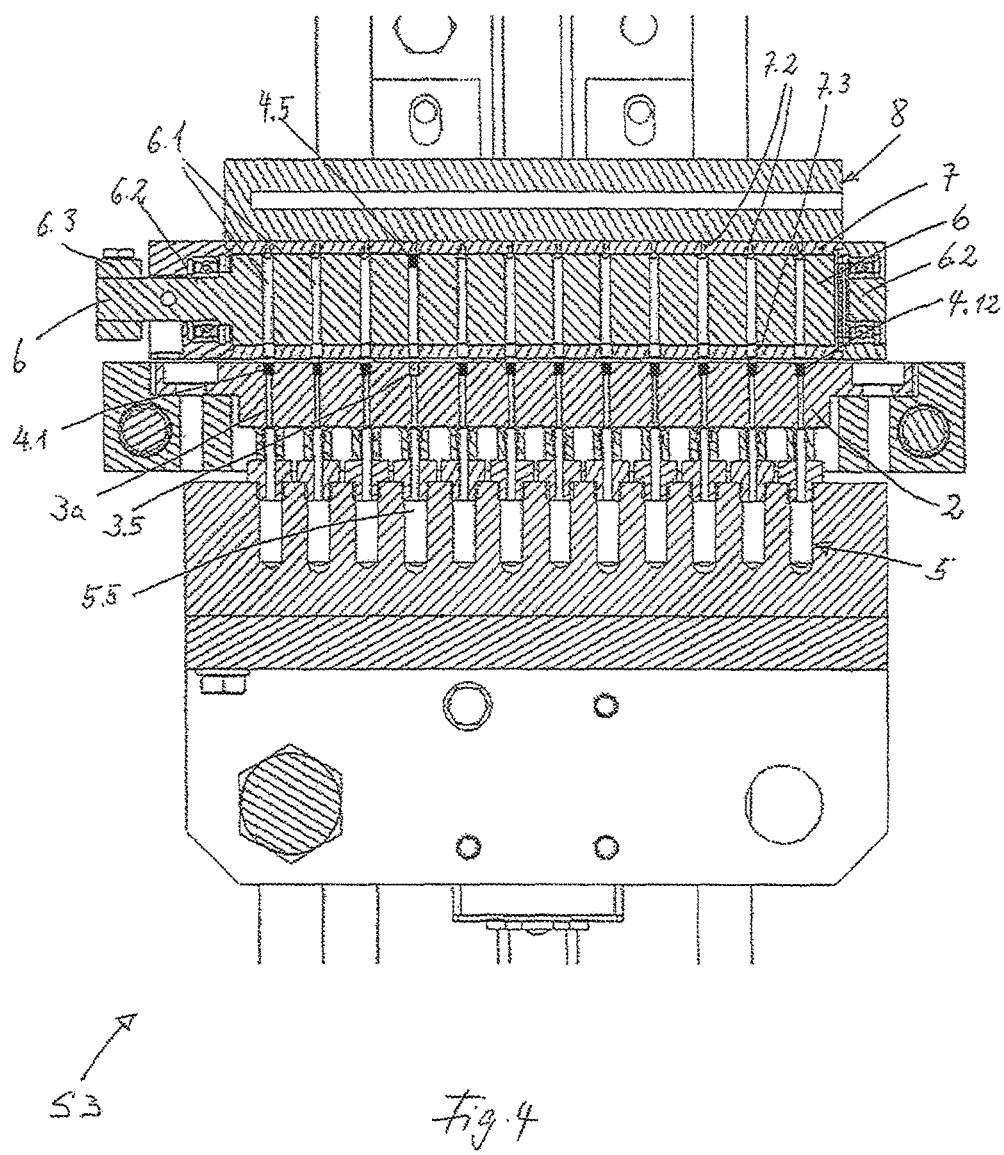
Figure 5:
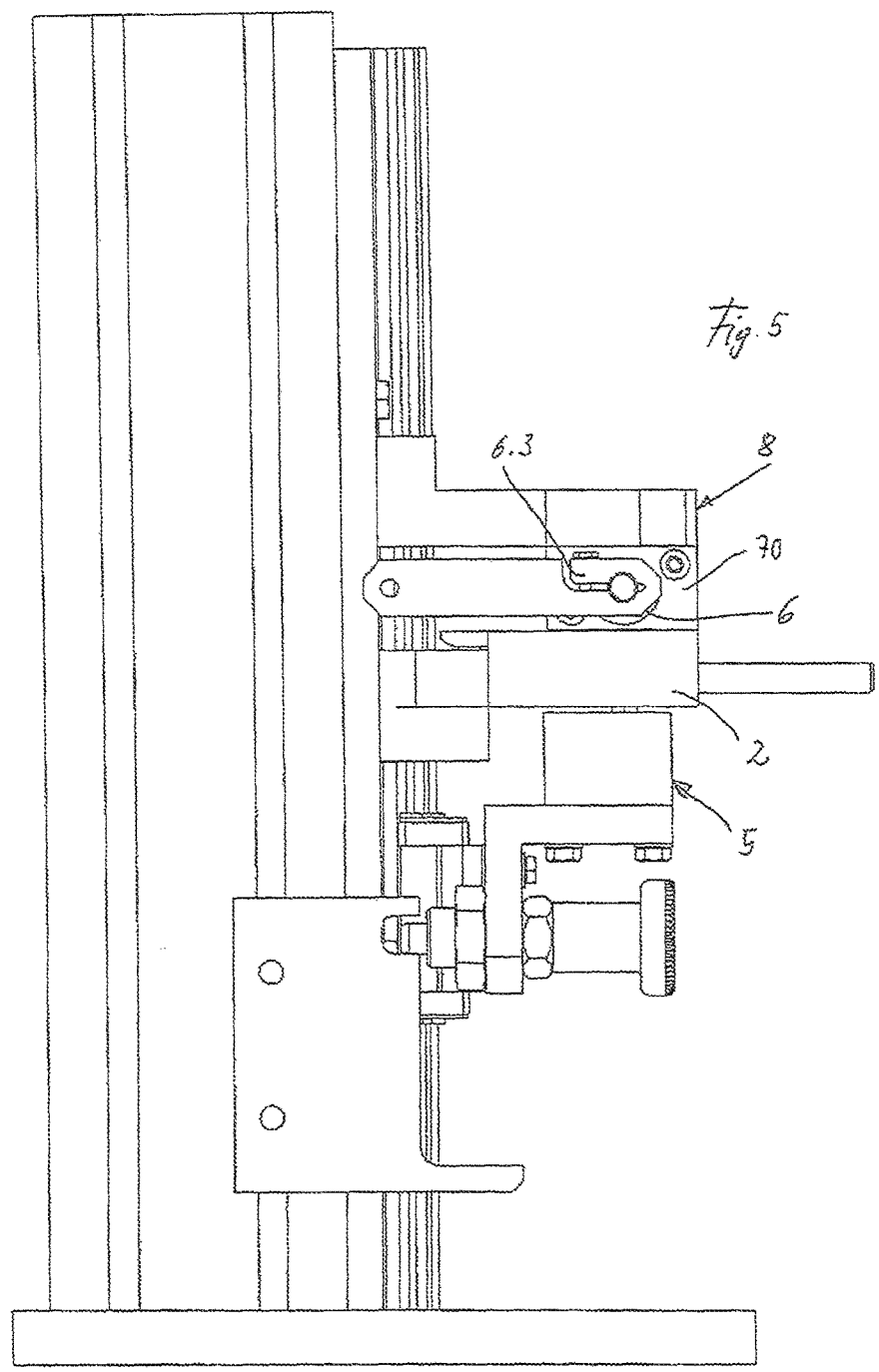
Figure 6:
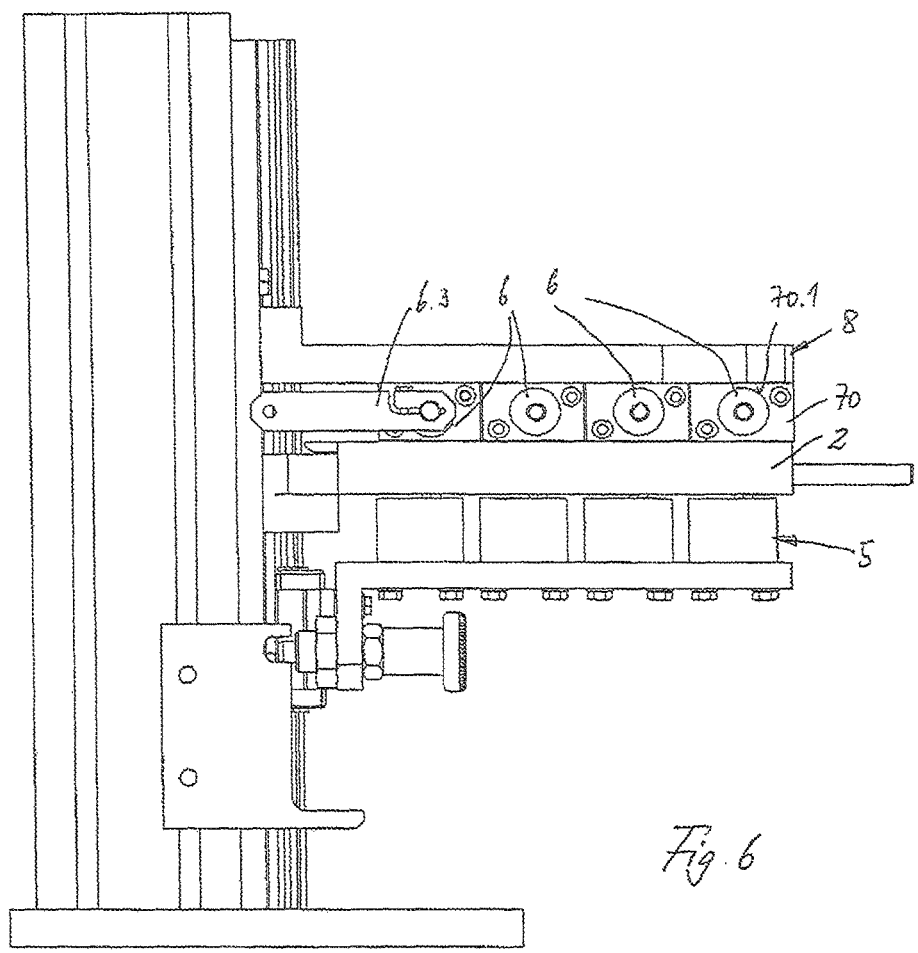

The invention is explained in more detail below with reference to the drawing, in which FIG. 1 shows a perspective view of an embodiment of a rotating table having a separation means, FIG. 2 shows a top view of a rotating table having additional stations, FIG. 3 shows a perspective view of a multicomponent filter composed of components, FIG. 4 shows a sectional view through a turning station, FIG. 5 shows a view from the left in FIG. 4, and FIG. 6 shows a lateral view of a turning station according to FIG. 5, having a plurality of turning members.

Figure 6A:
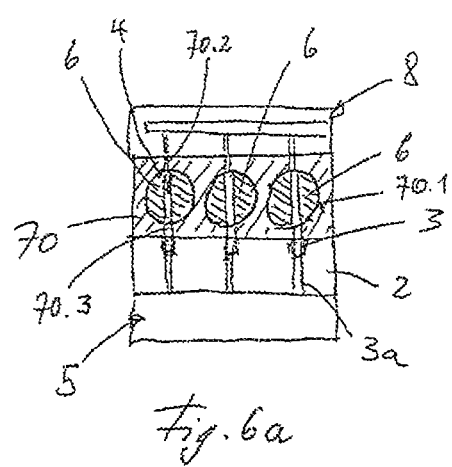

FIG. 6a is a cross-section view of an embodiment comprising three turning shafts.

FIG. 1 shows an exploded view of a separation means 1 having a receptacle 1a formed in a frame-shape for receiving cylindrical filter elements present as bulk material, a sieve place 1b forming the bottom of the receptacle 1a and having centering sleeve 1b', which engages a corresponding centering bore at the lower side of the receptacle 1a, and a buffer plate 1c. This separation means 1 is arranged above a rotating table 2 such that a group of receiving bores 3 in the rotating table 2 are positioned below the bores of the buffer plate 1c, such that individual filter elements can be transferred from the buffer plate 1c into the receiving bores 3 in the rotating table 2. By means of the separation means 1, the unsorted filter elements in the receptacle 1a are separated by means of the sieve plate 1b such that they are inserted into the receiving bores of the buffer plate 1c. The rotating table 2 forms a transfer means and it has in its circumferential area in this embodiment four groups of receiving bores 3. The rotating table 2 is arranged on a round switch table 2a, which rotates the rotating table 2 stepwise, so that the individual groups of receiving bores 3 are moved in a stepwise manner from one station into the next station. A handling means (not shown) removes the filter elements group-wise from the receiving bores 3 in the presentation station, which is positioned, for example, diametrically opposite the separation means 1, and transfers them for example into an intermediate storage of a placement means or directly into pipette tips arranged group-wise.

FIG. 2 shows a top view of a rotating table having, for example, eight stations in contrast to the four station of the rotating table represented in FIG. 1, wherein a group G1 to G8 of receiving bores 3 is present in each station. A group G can have, for example, 2 to 60 receiving bores 3. In station S1, the separation means 1 represented in FIG. 1 is positioned above the rotating table 2. In the next station S2, a means for position recognition of the filter elements in the receiving bores 3 of the rotating table 2 can be provided. In the direction of rotation of the rotating table shown by an arrow, a turning station S3 follows, which can be followed by a station S4, in which the filter elements aligned in the previous station S3 can be prepared or handled for further processing.

In the next position, diametrically opposite station S1, for example a filter presentation station S5 is provided, from which the filter elements are removed group-wise and inserted by the handling means (not shown) into an intermediate storage or directly into a group of pipette tips.

S6 and S8 are empty stations, between which a cleaning and reject station S7 can be provided, at which the receiving bores 3 in the rotating table 2 are cleaned and possibly filter elements or filter parts remaining in the individual receiving bores 3 are ejected.

The individual cylindrical filter elements which, in the separation means 1 of FIG. 1, are inserted into the individual receiving bores 3 of the rotating table 2, can for example have the construction represented in FIG. 3, according to which a cylindrical filter element 4 is composed of two individual components 4a and 4b. In FIG. 3, the lower component 4b is provided with a marking 4b1. In order to be able to determine the correct alignment of the filter element 4 with the component 4a above, the individual components 4a and 4b are, for example, differently colored or marked in another way, so that it can be determined which of the multicomponent filters 4 are inserted with correct alignment in the receiving bores 3 and which are not. For example, the upper component 4a has a red color, while the lower component 4b is blue. It is also possible to provide a different way of marking a multicomponent filter, so that in the station S2 by means of a position recognition means 20 the alignment of the filter elements 4 in the individual receiving bores 3 can be determined.

When inserting the filter elements 4 in the pipette tips (not shown), for example the component 4a must be positioned above and the component 4b must be positioned below. In the separation means 1 at the station S1, the individual filter elements 4 are inserted in different alignments into the receiving bores 3, so that for the one filter element 4 the component 4b is above and the component 4a is below, while in the adjacent receiving bore 3 a filter element 4 is arranged in converse alignment. This is determined in the position recognition station S2, wherein via a corresponding electronic analysis 21, for example an electronic camera, signals are output to the following turning station S3, in which the filter element 4 is ejected from the receiving bores 3 identified as incorrectly occupied, and is then turned.

FIG. 4 schematically shows an embodiment of the turning station S3, wherein in the rotating table 2 a row of, for example, twelve receiving bores 3 is formed, which are designated in the following as receiving pockets and as filter pockets 3.1 to 3.12. In the embodiment shown, eleven filter pockets 3.1 to 3.4 and 3.6 to 3.12 are occupied by correctly aligned filter elements 4, while in the filter pocket 3.5, which is the fifth from the left, an incorrectly aligned filter element was inserted, which was identified in the position recognition station S2 as incorrectly aligned.

Below the individual filter pockets 3, a bore 3a extends to a blowing and sucking means 5 arranged below the transfer means 2 and below the rotating table 2; by means of this blowing and sucking means, optionally low pressure or high pressure can be applied to individual bores 3a, wherein the blowing and sucking means 5 can be switched by means of a control means (not shown) in dependence on control signals, which in the embodiment shown are output from the position recognition station S2.

In the blowing and sucking means 5, hose connectors lead to each individual bore 3a for the application of suction pressure or high pressure, so that each individual bore 3a can be charged with low pressure or high pressure in dependence on the control signals from the position recognition station, as can be seen at 5.5 in FIG. 4.

Above the plate-shaped transfer means 2 and above the rotating table 2, a turning member 6 is arranged, which has a row of bores or recesses 6.1 respectively which are aligned with the filter pockets 3.1 to 3.12 and have the same cross-section as these. In FIG. 4, the filter element 4.5 is ejected from the filter pocket 3.5 by blowing pressure from the blowing and sucking means 5, so that it is positioned at the upper end of the associated bore 6.1.

In the next step, the turning member 6 is rotated by 180°, so that the filter element 4.5 is positioned in the turned position above the associated filter pocket 3.5, whereupon by means of suction pressure from the blowing and sucking means 5, the filter element 4.5 is again transferred into the filter pocket 3.5, from which it was previously ejected.

Hereupon, the rotating table 2 or a corresponding transfer means can be moved further, until a further row of filter pockets 3.1 to 3.12 is positioned below the bores 6.1 of the turning member 6.

In the embodiment shown, the turning member 6 which is rotatable by 180°, is formed as a cylindrical shaft or as a turning cylinder which is supported at both ends by bearings 6.2 and is rotatable by 180° by means of a rotary drive 6.3.

In the embodiment shown, the cylindrical turning member 6 is rotatable in a sleeve 7, which is provided opposite the filter pockets 3 and 3.1 to 3.12 with a bore 7.3 corresponding to the diameter of the filter pockets 3 for the passage of a filter member 4, while diametrically opposite bores 7.2 of smaller diameter are formed in the sleeve 7, by means of which suction pressure or high pressure can be applied.

A blowing and sucking means 8 is shown above the sleeve 7 of the turning member 6, by which optionally suction pressure or high pressure can be applied at the bores 7.2 of the sleeve 7.

In the embodiment shown, by the application of high pressure at the blowing and sucking means 8 the filter element 4.5 can be transferred into the associated filter pocket 3.5 additionally to the suction pressure of the blowing and sucking means 5 acting from below. Hereby, blowing pressure can act on all bores 7.2, because in this way, the filter elements 4 inserted in the filter pockets 3 are held in their position.

On the inner circumference of the sleeve 7, grooves can extend along a part of the inner circumference of the sleeve 7, which communicate with the bores 7.2, so that during turning of the filter element 4.5, this filter element 4.5 is held above a part of the circumference by means of the pressure applied at the associated bore 7.2.

Another means can also be provided for holding a filter element to be turned, like for example 4.5 in the position represented in FIG. 4, in the bore 6.1 of the turning member 6, until the turning member 6 is rotated by 180° and the pressure is switched.

FIG. 5 shows a lateral view of the device in FIG. 4, wherein the rotating table 2 is schematically represented as a plate 2 of a transfer means, which is displaced below the turning member 6 and can be moved back again.

The blowing and sucking means 5 can be arranged at the lower side of the transfer means 2 by lifting, and lowered by a downwards movement.

Various modifications of the described construction are possible.

The turning member 6 can also be formed as a plate, which is rotated by 180° in order to turn and align the filter elements contained in the bores 6.1 above the filter pockets 3.

Instead of sucking pressure and high pressure, pin-shaped ejection members can also be provided for ejecting filter elements 4 from the filter pockets 3 and transferring them into the turning member 6. Such a mechanical ejection means is especially advantageous when instead of filter elements, for example sleeve-shaped individual elements are to be used.

Instead of the position recognition station S2, an optical position identification means can also be provided at the turning station S3. At the position recognition station S2, the position recognition takes place advantageously by means of a camera inspection. In a corresponding way, in station S3 an optical inspection means can be installed.

According to another embodiment, the turning means can be moved relative to the rotating table 2 and relative to the transfer means 2, especially if at the rotating table 2 for example two adjacent rows of filter pockets 3 are provided, as is shown as an example in FIG. 1. The moving of the turning means relative to the rotating table 2 has the advantage that the cycle sequence of the rotation of the rotating table is not hindered.

According to a further embodiment, in the turning station, for example two adjacent turning shafts 6 can be provided above the two rows of filter pockets 3, wherein the two turning shafts 6 can also be rotatable by 180° independently of each other. In this way, at the turning station a relative displacement between rotating table 2 and turning means can be omitted because, by means of the turning means, all filter pockets 3 of a group of filter pockets consisting of two rows can be processed at the same time.

It is also possible to provide more than two turning members 6 in the turning means, in order to process a plurality of rows of filter pockets 3 with regard to turning of individual filter elements.

FIG. 6 schematically shows such an arrangement having adjacent turning shafts 6, which in this embodiment are all rotated by the turning means 6.3. The turning shafts 6 can also be individually rotatable by 180°.

In this embodiment, the turning shafts 6 are each rotatable by 180° in a bearing bore 70.1 of a block 70, wherein the block 70 takes over the function of the sleeve 7 in FIG. 4, so that the blow bores 7.2 and the through-bores 7.3 of the sleeve 7 can be provided in the block 70 as blow bores 70.2 and through-bores 70.3, as FIG. 6a shows.

The diameter of a turning shaft 6 is relatively large in relation to the length of a filter element 4 in FIG. 4. In FIG. 6a, the diameters of the turning shafts 6 are designed smaller. The diameter can be, for example, three to four times the length of a filter element.

If the turning member is movable relative to the rotating table 2 in the turning station, the turning means can be positioned on a slide, on which also a camera can be positioned for the position recognition of the filter elements, the opposite ends of which are usually differently colored.

In the turning member 6 or at the end of the bores 6.1 in the turning member 6, a holding-back means can be provided, which holds the ejected filter element back for a predetermined time. After that, after the holding back means releases the filter element, it can again be inserted into the associated filter pocket in the correct alignment.

The holding back means can be formed in various ways. As an example, a slide can be provided which is displaceable transverse to the bore 6.1 for blocking and releasing this bore.

It is also possible, for example, to provide pin-shaped members which protrude into the passage bore 6.1 for blocking the passage bore for a filter element, and are retracted for releasing it.

The holding back means can also be formed by applying a vacuum at the bore 6.1, wherein the vacuum can be applied at the bore 6.1 by means of lateral bores.

Instead of a rotating table 2, a transfer means can also be used, through which groups of receiving bores 3 are moved in a linear manner.

In dependence on the shape of the individual elements which are represented as cylindrical filter elements 4 in the above description, groups of receiving pockets can be provided at the transfer means 2 instead of receiving bores 3; these receiving pockets have a shape adapted to the shape of the single elements. The cylindrical shape of the single elements in the form of the filter elements 4 is to be regarded as an example.

Further, it is possible to act on all receiving bores 3 and corresponding receiving pockets in a station by means of a vacuum, in order to test whether all receiving bores 3 are occupied by a filter element 4. Such a test can also be provided, for example, already at separation means S1.

The invention claimed is:

1. Device for aligning single elements (4) especially filter elements, arranged in receiving pockets (3) of a transfer element (2), comprising
a position recognition apparatus which determines the alignment of the single elements (4) in the receiving pockets (3),
an ejecting device (5) for ejecting the single elements (4) recognized as incorrect from the associated receiving pockets (3),
a turning element (6) for turning the ejected single elements (4),
a blowing and sucking element (5, 8) for re-inserting the turned single elements (4) into the receiving pockets (3), and a control element for controlling the working steps following one another, wherein
the turning element has at least one turning member (6) rotatable by 180°, which has bores and recesses (6.1) for receiving a single element (4) to be turned,
wherein the at least one turning member is formed as a turning cylinder (6) having diametrically extending receiving bores and recesses (6.1), and
wherein the turning cylinder (6) is rotatable in a bearing bore of a stationary sleeve (7) or of a block (70).

2. Device according to claim 1, wherein at least one releasable holding-back element is provided which holds a single element (4) to be turned ready for delivery in the turning cylinder (6).

3. Device according to claim 1, wherein the receiving pockets (3) are provided with a blow bore (3a).

4. Device according to claim 1, wherein the turning cylinder (6) is displaceable relative to the transfer element (2).

5. Device according to claim 1, wherein a blowing and sucking element (5) is arranged, below a rotating table (2) as the transfer element, by means of which optionally low pressure or high pressure can be applied to in individual bores (3a), wherein
the blowing and sucking element (5) is switched by means of a control element in response to control signals which are output from the position recognition apparatus.

6. Device for aligning single elements (4), especially filter elements, arranged in receiving pockets (3) of a transfer element (2), comprising
a position recognition apparatus which determines the alignment of the single elements (4) in the receiving pockets (3),
an ejecting device (5) for ejecting the single elements (4) recognized as incorrect from the associated receiving pockets (3),
a turning element (6) for turning the ejected single elements (4),
a blowing and sucking element (5, 8) for re-inserting the turned single elements (4) into the receiving pockets (3) and
a control element for controlling the working steps following one another, wherein the turning element has at least one turning member (6) rotatable by 180°, which has bores and recesses (6.1) for receiving a single element (4) to be turned,
wherein the at least one turning member is formed as a turning cylinder 6 having diametrically extending receiving bores and recesses (6.1),
wherein
the turning cylinder (6) is rotatable in a bearing bore of a stationary sleeve (7) or of a block (70), and
wherein the sleeve (7) or the block (70) has a bore or recess (7.2, 7.3, 70.2, 70.3) opposite the ends of a receiving bore (6.1), wherein at a distance from the receiving pockets (3) the blow bore (7.2, 70.2) is positioned, which has a diameter which is smaller than the diameter of the receiving bores (6.1) while the bores and recesses abutting the receiving pockets (3) correspond to the cross-sectional shape of the receiving pockets.

7. Device according to claim 6, wherein a blowing and sucking element (8) via the sleeve (7) or the block (70) is arranged, by which optionally suction pressure or negative pressure at the bores (7.2) of the sleeve (7) or the blocks (70) is created.

8. Device according to claim 6, wherein grooves extend along a part of the inner circumference of the sleeve 7, which communicate with the bores 7.2.

9. Device for aligning single elements (4), especially filter elements, arranged in receiving pockets (3) of a transfer element (2), comprising
a position recognition apparatus which determines the alignment of the single elements (4) in the receiving pockets (3),
an ejecting device (5) for ejecting the single elements (4) recognized as incorrect from the associated receiving pockets (3),
a turning element (6) for turning the ejected single elements (4),
a blowing and sucking element (5, 8) for re-inserting the turned single elements (4) into the receiving pockets (3), and
a control element for controlling the working steps following one another,
wherein the turning element has at least one turning member (6) rotatable by 180°, which has bores and recesses (6.1) for receiving a single element (4) to be turned, wherein
the at least one turning member is formed as a turning cylinder (6) having diametrically extending receiving bores and recesses (6.1),
wherein
the turning cylinder (6) is rotatable in a bearing bore of a stationary sleeve (7) or of a block (70), wherein
the sleeve (7) or the block (70) has a bore or recess (7.2. 7.3. 70.2. 70.3) opposite the ends of a receiving bore (6.1), wherein at a distance from the receiving pockets (3) the blow bore (7.2. 70.2) is positioned, which has a diameter which is smaller than the diameter of the receiving bores (6.1) while the bores and recesses abutting the receiving pockets (3) correspond to the cross-sectional shape of the receiving pockets, and
wherein a plurality of turning cylinders (6) having diametrically extending bores (6.1) adjacent to each other are provided rotatably as a turning element.

10. Device for aligning single elements (4), especially filter elements, arranged in receiving pockets (3) of a transfer element (2), comprising a position recognition apparatus which determines the alignment of the single elements (4) in the receiving pockets (3), an ejecting device (5) for ejecting the single elements (4) recognized as incorrect from the associated receiving pockets (3), a turning element (6) for turning the ejected single elements (4), a blowing and sucking element (5, 8) for re-inserting the turned single elements (4) into the receiving pockets (3), and a control element for controlling the working steps following one another, wherein the turning element has at least one turning member (6) rotatable by 180°, which has bores and recesses (6.1) for receiving a single element (4) to be turned, wherein the at least one turning member is formed as a turning cylinder (6) having diametrically extending receiving bores and recesses (6.1), and wherein the turning cylinder (6) is rotatable in a bearing bore of a stationary sleeve (7) or of a block (70), wherein the turning cylinder (6) is displaceable relative to the transfer element (2), and wherein an electronic camera for position recognition of the filter elements is mounted at the turning cylinder (6), which camera, by means of control signals, controls the ejecting element at the single receiving pockets (3).

11. Device for aligning single elements (4), especially filter elements, arranged in receiving pockets (3) of a transfer element (2), comprising a position recognition apparatus which determines the alignment of the single elements (4) in the receiving pockets (3), an ejecting device (5J for ejecting the single elements (4) recognized as incorrect from the associated receiving pockets (3), a turning element (6) for turning the ejected single elements (4), a blowing and sucking element (5, 8) for re-inserting the turned single elements (4) into the receiving pockets (3), and a control element for controlling the working steps following one another, wherein the turning element has at least one turning member (6) rotatable by 180°, which has bores and recesses (6.1) for receiving a single element (4) to be turned, wherein the at least one turning member is formed as a turning cylinder (6) having diametrically extending receiving bores and recesses (6.1), and wherein the turning cylinder (6) is rotatable in a bearing bore of a stationary sleeve (7) or of a block (70), wherein at least one releasable holding-back element is provided which holds a single element (4) to be turned ready for delivery in the turning cylinder (6), and wherein the holding-back element is provided in the form of pin-shaped members which protrude into a passage bore (6.1) for blocking the passage bore for a filter element, and which are retracted for releasing it.

* * * * *